(12) United States Patent
Cuomo et al.

(10) Patent No.: US 9,385,975 B2
(45) Date of Patent: *Jul. 5, 2016

(54) USING CONTENT BASED ROUTING TO SCALE CAST IRON LIKE APPLIANCES

(71) Applicant: International Business Machines Corporation, Armonk, NY (US)

(72) Inventors: Gennaro A. Cuomo, Durham, NC (US); Dinakaran Joseph, Apex, NC (US); Victor S. Moore, Lake City, FL (US); Rishi Vaish, San Carlos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/568,869

(22) Filed: Dec. 12, 2014

(65) Prior Publication Data
US 2015/0222524 A1  Aug. 6, 2015

Related U.S. Application Data

(63) Continuation of application No. 14/171,983, filed on Feb. 4, 2014.

(51) Int. Cl.
*G06F 15/16* (2006.01)
*H04L 12/58* (2006.01)
*G06F 17/24* (2006.01)
*G06F 17/27* (2006.01)
*H04L 12/721* (2013.01)

(52) U.S. Cl.
CPC .............. *H04L 51/04* (2013.01); *G06F 17/248* (2013.01); *G06F 17/2705* (2013.01); *H04L 45/14* (2013.01); *H04L 51/32* (2013.01)

(58) Field of Classification Search
USPC .......................... 709/206, 203, 223, 239, 200
See application file for complete search history.

(56) References Cited

U.S. PATENT DOCUMENTS

| | | | |
|---|---|---|---|
| 6,557,027 B1 | 4/2003 | Cragun | |
| 6,765,931 B1 * | 7/2004 | Rabenko | H04B 3/23 348/E7.049 |
| 7,080,139 B1 | 7/2006 | Briggs et al. | |
| 7,206,813 B2 | 4/2007 | Dunbar et al. | |
| 7,295,657 B1 | 11/2007 | Keohane et al. | |
| 7,631,315 B2 | 12/2009 | Dadiomov et al. | |
| 7,702,739 B1 * | 4/2010 | Cheng | H04L 47/10 709/203 |
| 2002/0174248 A1 | 11/2002 | Morriss | |

(Continued)

OTHER PUBLICATIONS

Gilbert et al., The Duality between Message Routing and Epidemic Data Replication, Proceedings of the Eighth ACM Workshop on Hot Topics in Networks (Hot Nets 2009), Oct. 2009, pp. 1-6.

(Continued)

*Primary Examiner* — El Hadji Sall
(74) *Attorney, Agent, or Firm* — Scully, Scott, Murphy & Presser, P.C.; Nicholas Bowman, Esq.

(57) ABSTRACT

Routing messages to message queues may be provided. In one embodiment of the present disclosure, a message may be routed to a message queue based on topic of the message, content of the message, application for which the message was intended, and/or a set of rules such as a rule based on queue length and queue balancing. A template integration process may subscribe to one or more topic queues, from which input parameters are obtained for invoking a service request from an application.

7 Claims, 5 Drawing Sheets

(56) References Cited

U.S. PATENT DOCUMENTS

| | | |
|---|---|---|
| 2002/0194347 A1 | 12/2002 | Koo et al. |
| 2003/0003953 A1 | 1/2003 | Houplain |
| 2004/0117444 A1 | 6/2004 | Goodman et al. |
| 2006/0265454 A1 | 11/2006 | Forlenza et al. |
| 2007/0136428 A1 | 6/2007 | Boutboul et al. |
| 2007/0143472 A1 | 6/2007 | Clark et al. |
| 2008/0065725 A1 | 3/2008 | Choi |
| 2008/0281936 A1 | 11/2008 | Li et al. |
| 2009/0006410 A1 | 1/2009 | Choi |
| 2009/0068631 A1 | 3/2009 | Halliwell |
| 2010/0191525 A1* | 7/2010 | Rabenko ............ H04B 3/23 704/211 |
| 2011/0231495 A1 | 9/2011 | Westen et al. |
| 2011/0276636 A1* | 11/2011 | Cheng ............ H04L 69/14 709/206 |
| 2012/0071855 A1 | 3/2012 | Pecora et al. |
| 2012/0179767 A1 | 7/2012 | Clarke et al. |
| 2012/0192205 A1 | 7/2012 | Bhasin et al. |
| 2012/0198004 A1 | 8/2012 | Watte |
| 2012/0244505 A1 | 9/2012 | Lang et al. |
| 2015/0222571 A1 | 8/2015 | Cuomo et al. |

OTHER PUBLICATIONS

International Search Report together with the Written Opinion of the International Searching Authority dated Mar. 6, 2014 from International Application No. PCT/CA2013/050960.
Office Action dated Jul. 6, 2015 received in co-pending U.S. Appl. No. 14/060,181.
Office Action dated Apr. 23 2015 received in co-pending U.S. Appl. No. 13/715,457.
Office Action dated Nov. 25, 2014 received in U.S. Appl. No. 13/715,457.
Office Action dated Aug. 5, 2015 received in U.S. Appl. No. 13/715,457.
Office Action dated Sep. 25, 2015 received in U.S. Appl. No. 14/171,983.
Office Action dated Mar. 14, 2016 received in U.S. Appl. No. 14/060,181, pp. 1-7.

* cited by examiner

USING CONTENT BASED ROUTING TO SCALE CAST IRON LIKE APPLIANCES

CROSS-REFERENCE TO RELATED APPLICATIONS

The present application relates to co-owned U.S. patent application Ser. No. 13/715,457, filed on Dec. 14, 2012, entitled A LOW LATENCY MESSAGING CHAT SERVER, the entire content of which is incorporated herein by reference.

FIELD

The present application relates generally to computers, computer applications and communications, and more particularly to using content based routing.

BACKGROUND

Software appliances exist that are used to integrate applications together. For example, integration may be performed between one or more on-premise or on-site applications and one ore more off-premise applications (e.g., those provided on a software-as-a-service platform). Such appliances as well as the applications they integrate may experience a large amount messages that are not easily scalable.

BRIEF SUMMARY

A method for context based routing of messages, in one aspect, may comprise receiving a message for routing by a message switch implemented in a hardware processor. The method may also comprise parsing the message to identify a topic and a data payload of the message. The method may further comprise identifying a topic queue to which to route the message based on the topic and the data payload. The method may also comprise routing the message to the topic queue. The method may further comprise executing automatically a template integration process subscribing to the topic queue, in response to the message being routed to the topic queue, the template integration process invoking an application service with a request comprising data extracted from the message. The method may also comprise receiving by the template integration process a result from the application service. The method may further comprise processing the result and placing the result to a destination point.

A system for context based routing of messages, in one aspect, may comprise a message switch comprising at least a hardware processor and a plurality of topic queues, the message switch operable to receive a message, parse the message to identify a topic and a data payload of the message, identify a topic queue among the plurality of topic queues, to which to route the message based on the topic and the data payload, and route the message to the topic queue. A template integration process may subscribe to the topic queue, the template integration process executed automatically in response to the message being routed to the topic queue, the template integration process invoking an application service with a request comprising data extracted from the message, the template integration process further operable to receive a result from the application service and process the result and place the result to a destination point.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Routing messages to message queues may be provided. In one embodiment of the present disclosure, a message may be routed to a message queue based on the topic of the message, content of the message, application for which the message was intended, and/or a set of rules such as a rule based on queue length and queue balancing. The message queue to which the message may be routed may be selected from one or more of a network, a service access point (SAP), an Internet address message switch, and an application. A message queue (also referred to as a topic queue) may be associated with a specific application.

In one embodiment of the present disclosure, a message fabric used in the present disclosure may include the low latency messaging mechanism disclosed in the co-owned U.S. patent application Ser. No. 13/715,457. In one embodiment of the present disclosure, a "publish/subscribe" based message switch may be employed to scale appliances, such as a software integration tool that may integrate off-premise (e.g., provided in a cloud computing environment or the like platform) and on-premise (e.g., local to the user's computer) applications. An example of such product may include Cast Iron™ from International Business Machine (IBM) of Armonk, N.Y.

Figure 1:
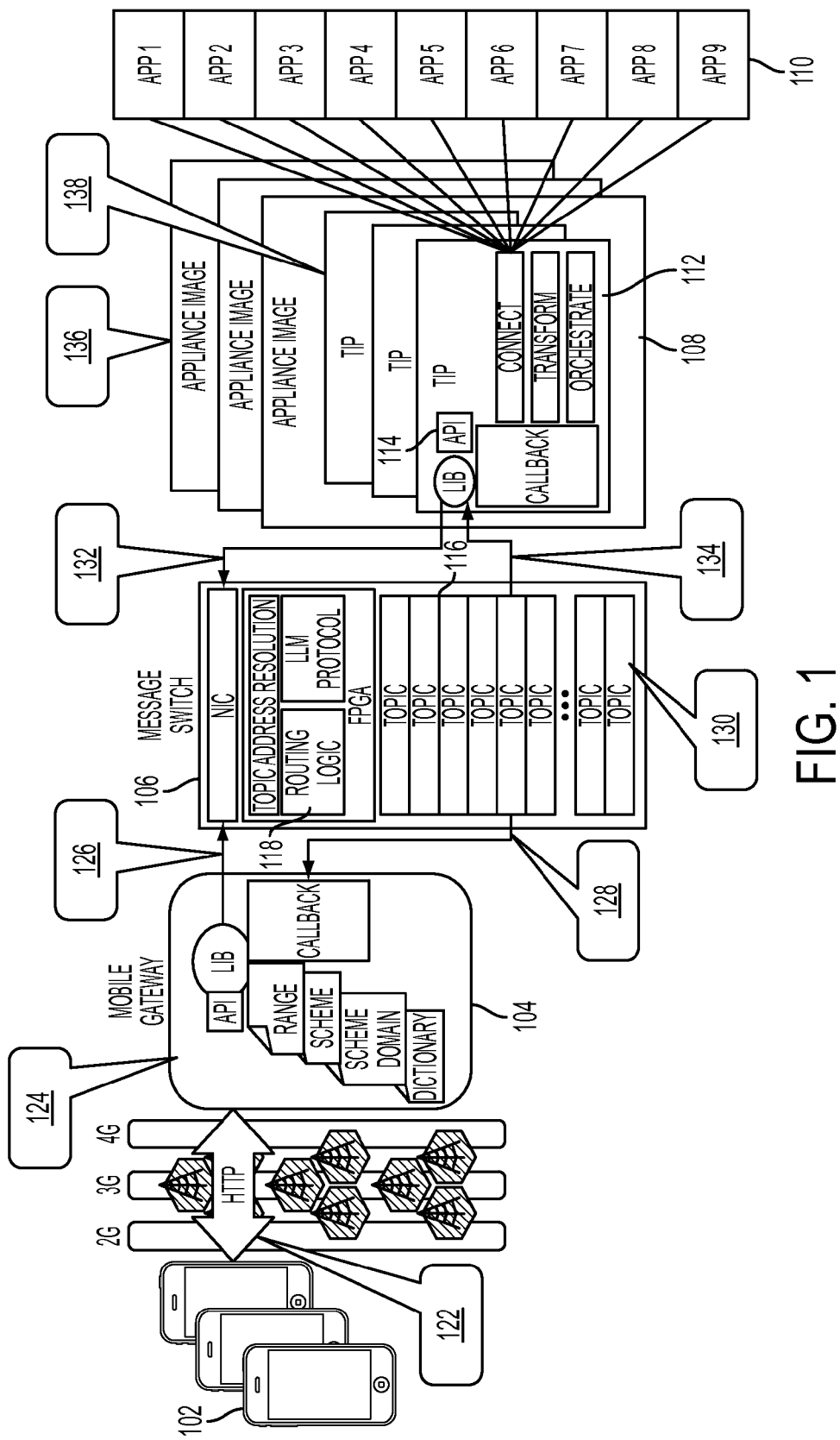
FIG. 1 illustrates an architectural overview of messages routed to applications via an application integration appliance tool using message switches in one embodiment of the present disclosure.

FIG. 1 illustrates an example of messages that may be provided to a message switch in one embodiment of the present disclosure. Application programming interfaces (APIs) may be provided to mobile devices 102 or the like for the list of services implemented by the template integration processes (TIPs), for example, at 122. TIPs are preconfigured templates that are further configurable (e.g., editable) and executable to provide a service. In one aspect, TIPs are used to integrate applications. In one embodiment of the present disclosure, TIPs are programmed or configured to work with topic queues or message queues. Messages from mobile devices 102 on a cellular network may be routed via a mobile gateway 104 to a message switch 106. The mobile gateway 104 may process requests, responses and notifications (e.g., 124). A large number of messages may be provided (e.g., which could easily be in the millions per second range) to the message switch 106. The mobile gateway 104 may include a mechanism that formulates the data received from mobile devices 102 into messages that are compatible with the message switch 106. An example of such message format is described in the co-owned U.S. patent application Ser. No. 13/715,457. Generally, a message includes a topic and a data payload. The mobile gateway 104 may provide non-blocking publish (e.g., at 126), subscribe to result topics in the message switch 106 and set a callback (e.g., shown at 128). Result topics may include returned results from an application 110 which processed the mobile device's request (e.g., service results from an application). Callback generally refers to a piece of executable code or function that may be passed as an argument to other code; the other code is expected to execute the argument (callback code) at some time.

The message switch 106 may comprise a network interface card for connecting the message switch 106 to a computer network and one or more processors or integrated circuits such as field programmable gate array (FPGA). FPGA or the like component may comprise a topic address resolution module for resolving topic addresses, a routing logic, an LLM protocol, and memory. Incoming packets may be managed by a control plane in the message switch 106. The message switch 106 may also include one or more topics (message queues).

Briefly, a topic is a name given to a message queue. A message queue is associated with only one topic in one embodiment of the present disclosure. It is addressed by that topic and has a storage structure for saving messages associated with that topic. Messages are retrieved from a message queue in first-in-first-out (FIFO) order. A message payload is an ordered list of data. A format is an ordered list that contains a version number followed by a subset of names extracted from a format domain. In the context of the present disclosure, a format describes the structure of a message payload (or data format of a payload). A message includes a topic, a format, and a payload in one embodiment of the present disclosure. Messages are published to a topic. To publish a message to topic XX means to send that message to the message queue named XX. The messages in a message queue all have the same topic and format. To subscribe to a topic means that the message queue for that topic will send to the subscriber all of the messages it receives, in one embodiment of the present disclosure. A subscriber can poll the message queue for new messages or the subscriber can assign a callback to the message queue, to directly receive messages as they arrive. A range is a list of topics to which a given user is allowed to publish. A domain is the list of topics to which a user can subscribe. An Access Control List (ACL) defines who can subscribe or publish to a topic. In one embodiment of the present disclosure, there is one ACL for subscription and another ACL for publishing (publish). A message switch ingests a message, strips out the enclosed topic, and routes that message to the message queue with the same name as that topic. All state may be kept in topics, e.g., shown at 130.

The message switch 106 may extract and use the message topic to route the message to the specific application 110 needed to process its payload. The owner of the message switch may program the "topic address resolution" logic to associate messages to their corresponding message queues. In this example, the payloads contain data for accessing services on the Internet and may be designed for consumption by an appliance 108 for processing. For instance, the "topic address resolution" logic associates a message topic to a particular application and hence its respective queue. An example of such appliance may include IBM's Cast Iron™. However, it should be understood that the methodologies of the present disclosure does not limit its functionalities to that product only. Rather, the methodologies of the present disclosure may work with and apply to different appliances.

An appliance 108 may provide a template-based integration method for integrating applications 110. Such templates 112 are pre-built to include activities or processes that are executed by the appliance. An appliance 112 or such application runs on a processor such as one or more central processing units (CPUs), and also on which the appliance may execute the one or more TIPs. An appliance (also shown at 136) may be stateless. In one embodiment of the present disclosure, the components labeled as one or more TIPs (Template Integration Process) 112 subscribe to the one or more respective topics in the message switch to which the ingested messages associated with that specific appliance are posted. For instance, messages may be posted by a device (e.g., 102) wishing to use the functionality provided by an appliance, e.g., 112. A TIP 112 may be allocated dynamically as needed by topics (also shown at 138). For instance, a queue (topic) can cause a TIP within an appliance (e.g., Cast Iron) to be created (or allocated) to process the messages waiting within the queue. TIPs are evoked when their input parameters are present, e.g., by topic callback (also shown at 138). In one embodiment of the present disclosure, a TIP 112 may be notified via a callback that a message is waiting for processing. The TIP 112 fetches the waiting message via a provided message switch API 114.

Saving response is shown at 132. Caching, queuing, multiple fan-outs, callbacks and TIPs subscribe to topics, shown at 134.

Arriving messages are put into a topic queue 116 in the message switch 106. For instance, these messages are arriving at the message switch 106 from mobile devices 102 and are being routed to the respective queues 116. In one embodiment of the present disclosure, they are fetched from this queue 116 by the TIPs 112 in the order in which the messages arrive. The message queue 116 isolates the appliance 108 from the speed at which messages are ingested and posted. This protects the appliance from being overrun with data and thus improves its scalability. In one embodiment of the present disclosure, the TIPs on the average retrieve messages from their respective queues at a rate sufficient to keep these queues from over flowing.

To mitigate a possibility of overflows in the topics 116, a routing algorithm 118 in the message switch 106 may be made sensitive to the length of each topic queue 116. For example, if the queue length exceeds a specified length then further posting to that topic may be halted through message flow control or through message spraying. In message spraying, more than one message queue is assigned to a topic. This topic is then said to be spray able. A subscription to a spray able topic creates a callback to one of the queues assigned to that topic. The specific queue is chosen at random, in "round robin" fashion, or through another mechanism. The goal may be to spread the subscriptions evenly across all of the queues for a spray able topic.

Ingested messages bound for a spray able topic are sent to the queues for that topic in a manner that normalizes the queue lengths for each queue. In this way slow message consumers (topic subscribers) cause the routing algorithm to favor other queues with faster message consumers. Thus slow message consumers cannot block fast messages consumers or force message queue overflows. This also distributes the burden of processing the message payloads across multiple appliances, for example, thus making an appliance more scalable.

Figure 2:
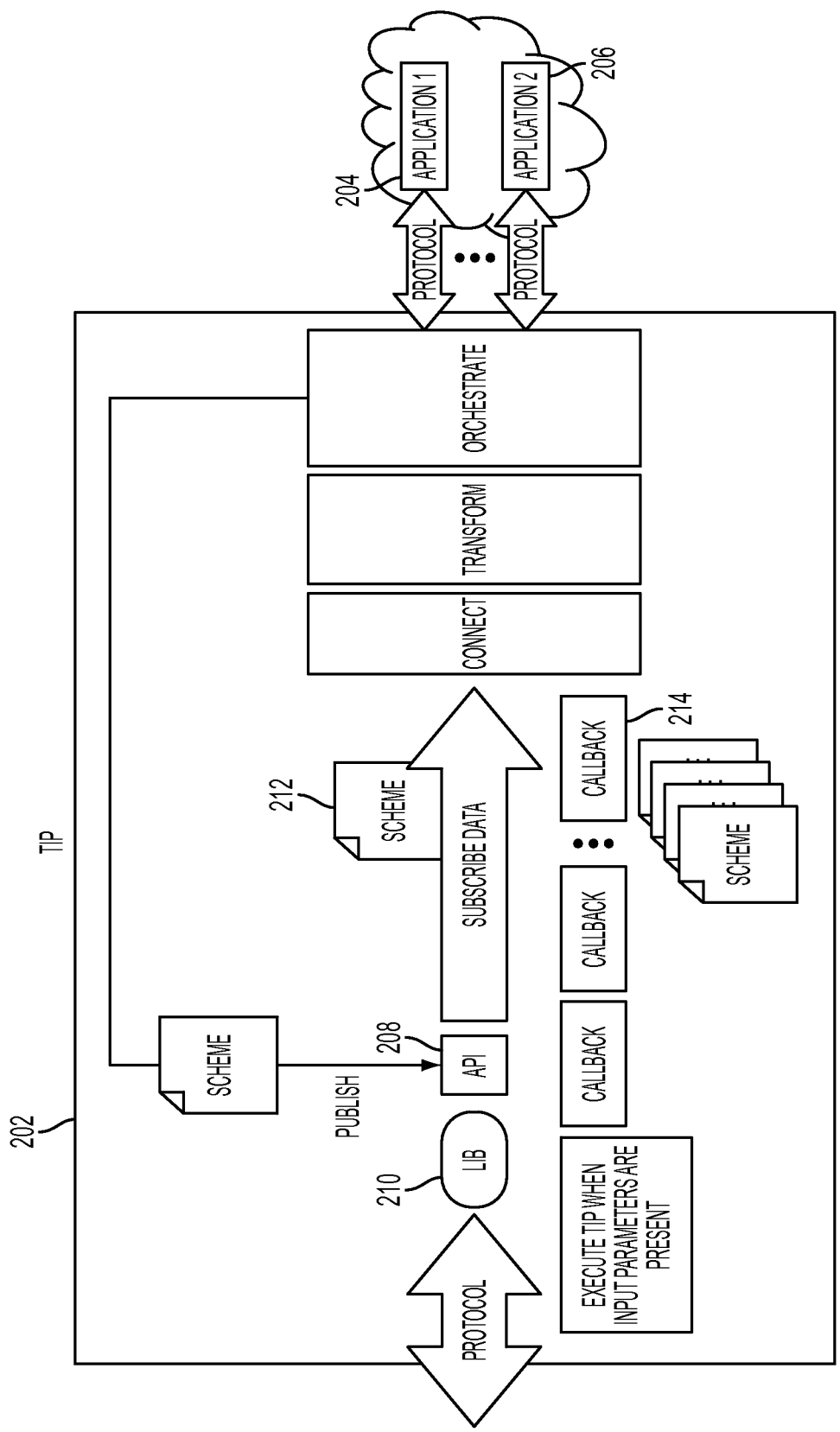
FIG. 2 illustrates a Template Integration Process (TIP) in one embodiment of the present disclosure.

FIG. 2 illustrates a Template Integration Process (TIP) in one embodiment of the present disclosure. TIPs are pre-built templates used for integration between applications and are customizable. A TIP 202 may include capabilities for connecting to applications (e.g., 204, 206), capabilities for transforming data and capability for orchestrating (e.g., managing activities in the integration project). A service may be provided via one or more TIPs. A TIP 202 is a reusable service component, which for example, may specify activities executed for application integration. A TIP is allocated and executed when its input parameters are present. For instance, a TIP may subscribe to a topic queue and a TIP can be instantiated newly for such a subscription. In another aspect, an existing TIP that is not being used can be employed and assigned for the task. A TIP may also create a message. A message is defined by a scheme. TIPs process their inputs, orchestrate the collection and transformation of data from all applicable sources and create therefrom a message with the processed results. In one embodiment, the structure of this message is determined by a scheme (e.g., 212) that defines the message type expected by the component that will receive this message from the appliance (e.g., Cast Iron appliance). Services are exposed to applications as a client API (e.g., 208). A TIP 202 may be notified via a callback (e.g., 214) that a message is waiting for processing. A TIP may fetch the waiting message via a provided message switch API. The API 208 may utilize one or more library files or executable objects shown as LIB 210 to fetch the waiting message.

When a TIP 202 completes the processing and enrichment of the message payload received from a topic, it formulates another message and sends that message back through the message switch. The message's topic identifies the topic queue to which the message is routed. A message can be routed to another application like Cast Iron™ for further processing and enrichment or it can be routed to another network like the Internet.

Figure 3:
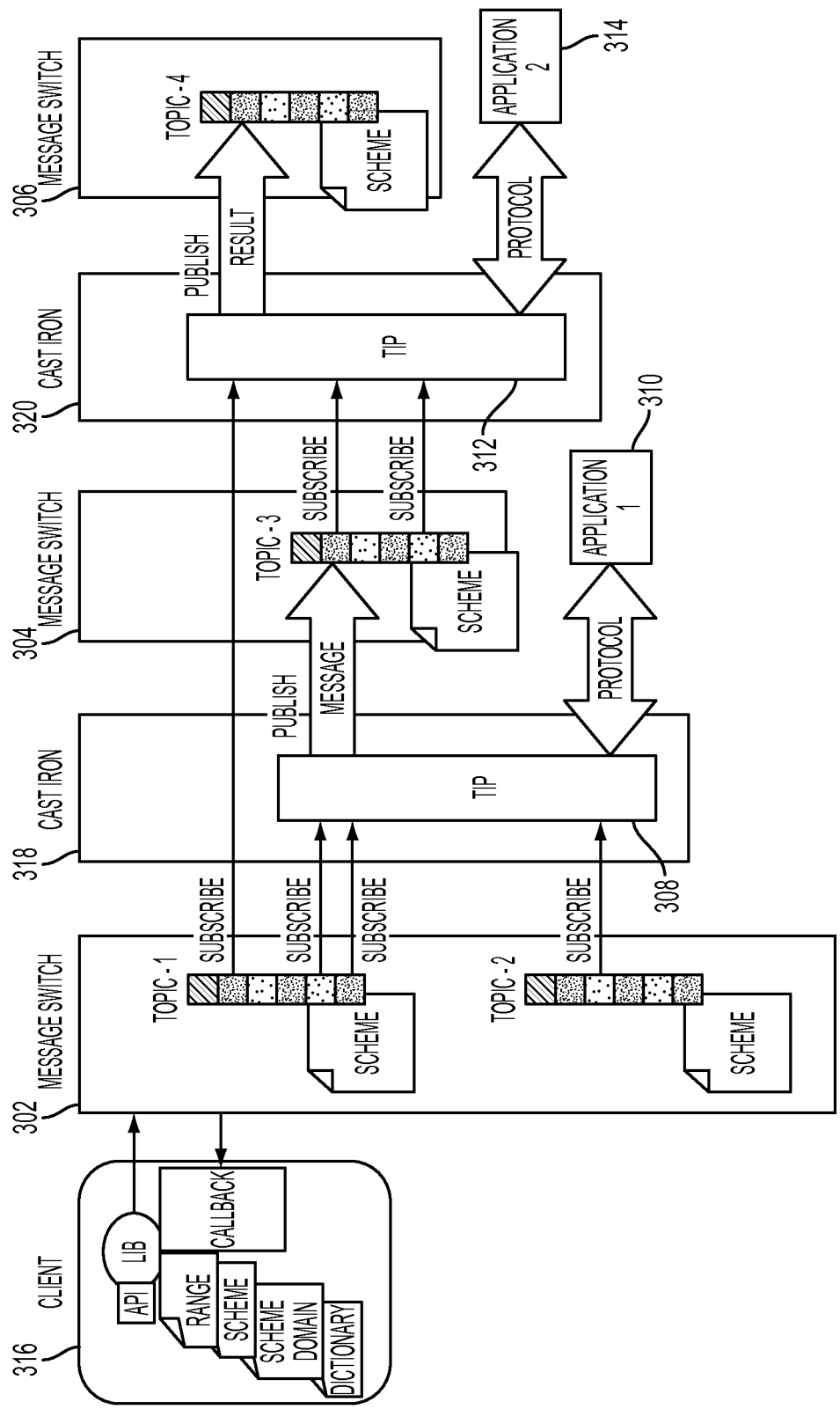
FIG. 3 illustrates multiple passes through a single message switch in one embodiment of the present disclosure.

FIG. 3 illustrates multiple passes through a single message switch in one embodiment of the present disclosure. For illustration purposes only, the message switch 302 is shown multiple times (shown at 304 and 306), but they all refer to the same message switch. As an example, one or more incoming messages may be routed to a TIP 308 for a first application 310, e.g., based on the message topic. An example of an application is an enterprise resource planning (ERP) application. For instance, the message topic that has the one or more incoming messages may be associated to the first application 310 within the "Topic Resolution Logic". In the example shown in FIG. 3, the topic queues include "Topic-1" or "Topic-2." For instance, the TIP for the first application 310 may have subscribed to messages of "Topic-1" and "Topic-2". The associated TIP 308 is evoked when all of its inputs (parameters needed by the TIP to execute its functions) are available. The inputs or parameters may be made available from the one or more queues to which the one or more TIPs (or something else) subscribe. For instance, if the queue has the data needed by a TIP, the TIP executes. The TIP 308 uses the input data to create a request associated with the application 310, in this example, an ERP application request. It then takes the results returned from the application 310 and creates from it a new message for the message switch. For instance, the TIP is programmed to formulate that message into one suitable for the message switch, responsive to receiving a message back from an application, e.g., the ERP application, so it can be routed back through the message switch for further processing. As another example, the TIP 308 may be programmed to send this new message to another message queue, e.g., the message topic for the second TIP 312 that for instance subscribes to Topic-3 message queue. Thus, a TIP may be programmed to subscribe to a message queue, obtain data from the message queue, send a request to an associated application using the data, receive a message back from the associated application regarding the request, further process this message received from the associated application, and publish the message to a topic queue. An example of processing the message received from the associated application may be sending the message via a message switch (e.g., publish or post to a message or topic queue in the message switch) to one or more devices that originated the request, sending the message to another topic queue, to which another TIP may be subscribing to formulate a request to another application, and others.

To continue with the example processing shown in FIG. 3, the second TIP 312 takes its inputs from the message payloads sent to Topic-1 and Topic-3. That is, the second TIP 312 may be subscribing to messages having topics of Topic-1 and Topic-3. For instance, in this example, the second TIP 312 is programmed to receive messages from multiple queues, e.g., Topic-1 and Topic 3. From this data the second TIP 312 builds a request for another application 314 (e.g., Sales Force) and sends the request out to the application 314. The results of the request may be returned from the application 314, and may be built into another message that is sent to the message switch for further routing to the messages owner.

Routing the output messages from a TIP back through the message switch 302 allows TIPs (e.g., 308, 310) to be linked into a common solution where each is isolated from the other by message queues. This loose coupling makes an appliance (e.g., Cast Iron™) more scalable. In addition, the message switch provides intelligent content based routing and load balancing.

A client 316 may send to and receive messages from one or more applications 310 and 314 using a callback function, an API and LIB functions of a message switch. This API and its supporting code are labeled as "Lib", "Callback" and "API" at 316. This API may be used to subscribe to topics and to post messages to topics. In one embodiment of the present disclosure, for each topic subscription the API may provide a "callback" buffer to receive the messages posted to the "subscribe to topic".

In the example shown, TIP 308 running in the appliance at 318 may provide a service of an application at 310 to the application at 314 via TIP 312 running in the appliance at 320; TIP 312 running in the appliance at 320 may provide a service of the application at 314 to another application or back to the client 316.

Figure 4:
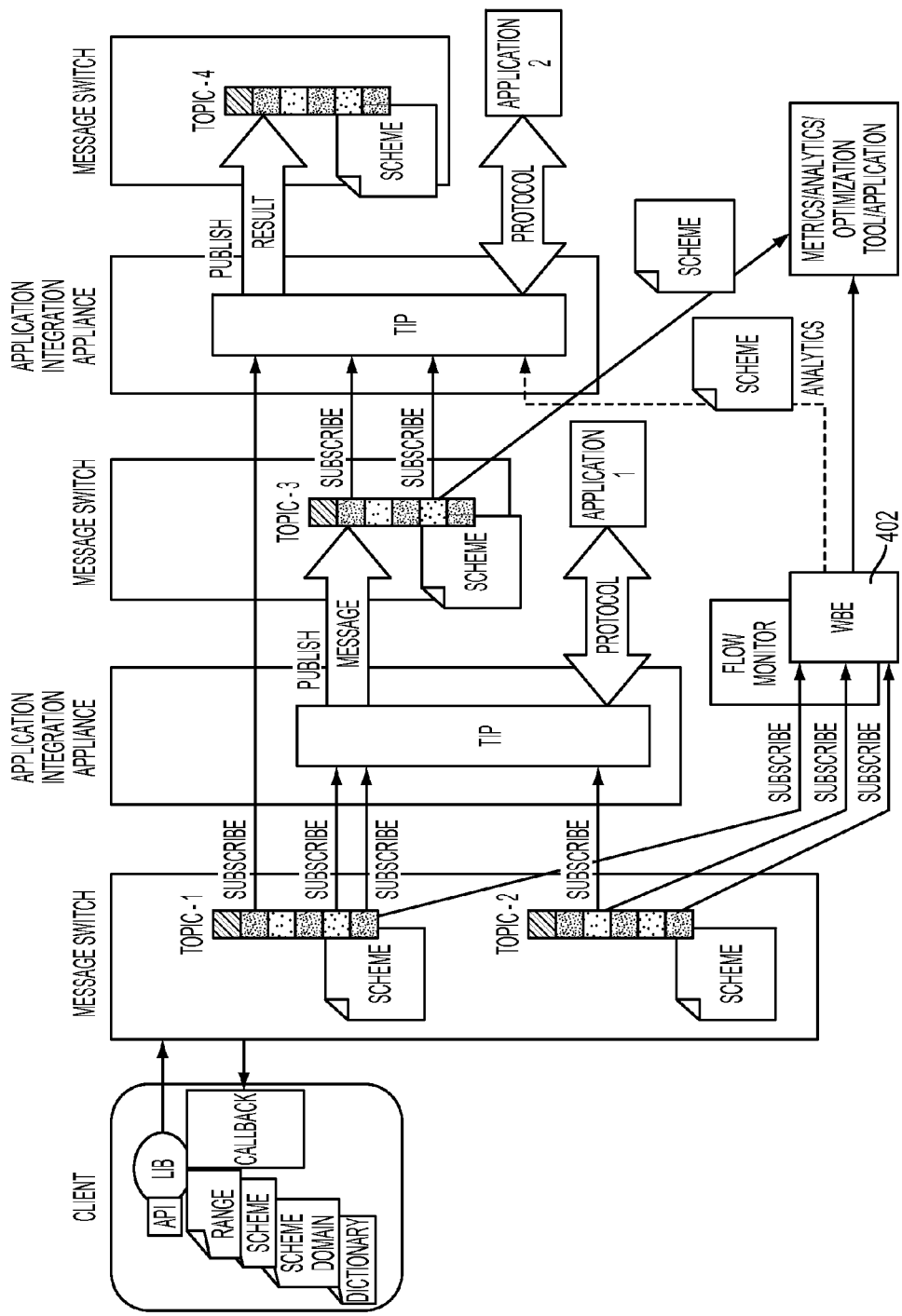
FIG. 4 illustrates messaging via a message switch in another embodiment of the present disclosure.

FIG. 4 illustrates messaging via a message switch in another embodiment of the present disclosure. In this embodiment, an event server 402 (e.g., IBM "WebSphere Business Events" (WBE) server) may be added to the message switch architecture to provide analytics and temporal based rules for routing messages. Such event server 402 may take inputs from the arrival notifications for messages and from the data within message payloads themselves. In addition, the event server 402 may create and send messages of its own back into the message switch to complement the data provided to the TIPs. This feedback can alter what a TIP does and can change the order in which TIPs are executed. It in effect adds temporal rules to the routing and evaluation of message payloads.

Figure 5:
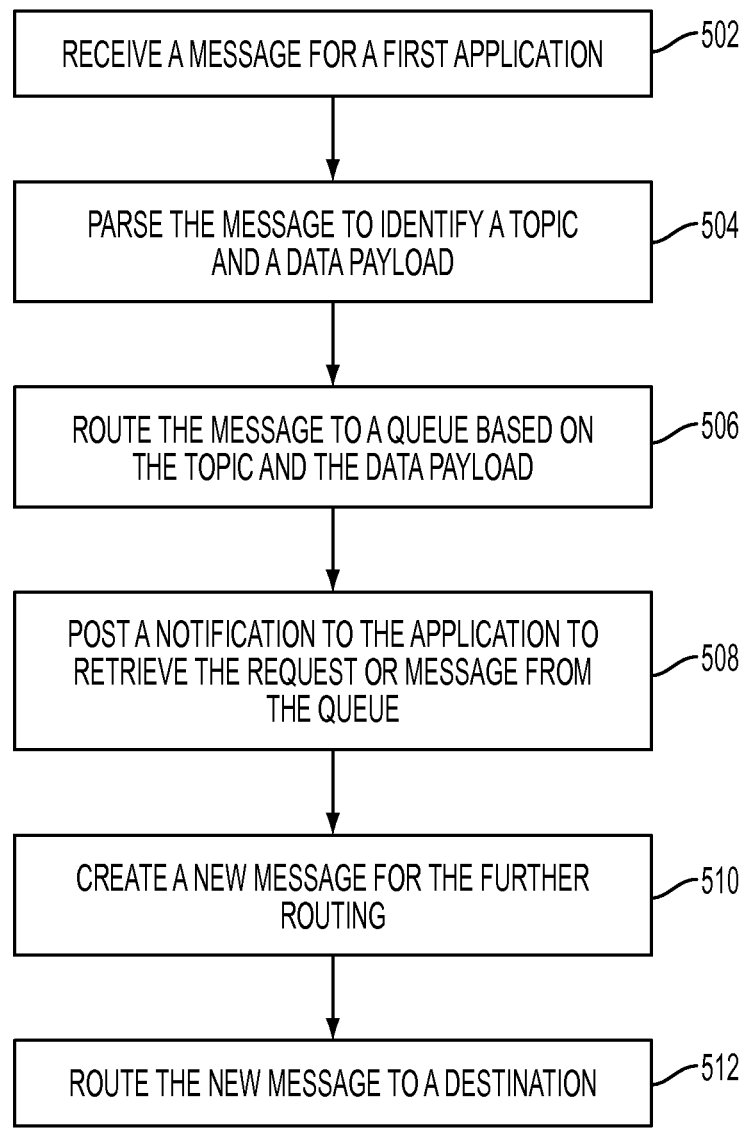
FIG. 5 is a flow diagram illustrating a method for context based routing in one embodiment of the present disclosure.

FIG. 5 is a flow diagram illustrating a method for context based routing in one embodiment of the present disclosure. At 502, a request or message may be received for a first application, for example, by a routing interface. An example of the routing interface may include the message switch (e.g., shown in FIG. 1 at 106). At 504, the request or message is parsed to identify a topic and a data payload. At 506, the request or message is routed to a queue based on the topic and the data payload. The request or message may be routed to a queue also based on one or more criteria, e.g., a rule or policy. The criteria may be based on a queue length and a queue balancing to spread out processing and improve scaling. The criteria may utilize analytics and temporal based rules for routing messages. The queue selected for routing may be associated with a particular application, a network, or a service access point (SAP). For instance, the message switch (e.g., shown in FIG. 1 at 106) may route the message to an appropriate topic.

At 508, a notification may be posted to the application to retrieve the request or message from the queue. For instance, a template integration process or the like process may be subscribing to the queue (a topic queue), and the posting of the message evokes the template integration process to be executed. In another aspect, the notification may trigger dynamically creating and executing of a template integration process or the like process to process the message in the queue.

As described above, such template integration process or the like process uses the data of the message as its input parameter to invoke a service of an application (e.g., Internet application, cloud application, or the like). Such template integration process or the like process may create a new message, e.g., based on the service result information received from the application program, which may be posted on another topic queue for processing.

Hence, at 510, a new message may be created for further routing, if applicable. At 512, the new message may be routed to a destination. The destination may be a message switch queue, which may be associated with a network, a service access point (SAP), a message switch, or a second application, and selected based on the message topic.

The methodologies of the present disclosure may be implemented on one or more computer systems. A computer system described herein is only one example of a suitable processing system and is not intended to suggest any limitation as to the scope of use or functionality of embodiments of the methodology described herein. The processing system may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units, a system memory, and a bus that couples various system components including system memory to processor. The processor may include a module that performs the methods described herein. The module may be programmed into the integrated circuits of the processor, or loaded from memory, storage device, or network or combinations thereof.

Bus may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory can include computer system readable media in the form of volatile memory, such as random access memory (RAM) and/or cache memory or others. Computer system may further include other removable/non-removable, volatile/non-volatile computer system storage media. By way of example only, storage system can be provided for reading from and writing to a non-removable, non-volatile magnetic media (e.g., a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces.

Computer system may also communicate with one or more external devices such as a keyboard, a pointing device, a display, etc.; one or more devices that enable a user to interact with computer system; and/or any devices (e.g., network card, modem, etc.) that enable computer system to communicate with one or more other computing devices. Such communication can occur via Input/Output (I/O) interfaces.

Still yet, computer system can communicate with one or more networks such as a local area network (LAN), a general wide area network (WAN), and/or a public network (e.g., the Internet) via network adapter. As depicted, network adapter communicates with the other components of computer system via bus. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for context based routing of messages, comprising:
    receiving a message for routing by a message switch implemented in a hardware processor;
    parsing the message to identify a topic and a data payload of the message;
    identifying a topic queue to which to route the message based on the topic and the data payload;
    routing the message to the topic queue;
    executing automatically a template integration process subscribing to the topic queue, in response to the message being routed to the topic queue, the template integration process invoking an application service with a request comprising data extracted from the message;
    receiving by the template integration process a result from the application service; and
    processing the result and placing the result to a destination point.

2. The method of claim 1, wherein the message is the topic queue identified based further on one or more criteria.

3. The method of claim 2, wherein the one or more criteria comprises queue length and a queue balancing for spreading out a number of the messages among a plurality of topic queues.

4. The method of claim 1, the one or more criteria utilize analytics and temporal based rules for routing messages.

5. The method of claim 1, wherein said processing the result and placing the result to a destination point comprises:
    creating a new message for further routing based on the result;
    routing the new message to the destination point, wherein the destination point comprises another topic queue.

6. The method of claim 5, wherein said creating and said routing is performed based on the template integration process that is preconfigured to create the new message and to route the new message to said another topic queue.

7. The method of claim 1, wherein the template integration process is preconfigured to invoke the application service in response to the message being routed to the topic queue.

* * * * *